United States Patent [19]

Schulz et al.

[11] Patent Number: 4,560,103
[45] Date of Patent: Dec. 24, 1985

[54] APPARATUS FOR HEATING AND VENTILATING

[75] Inventors: Joachim Schulz, Mudau; Werner Thelen, Buchen, both of Fed. Rep. of Germany

[73] Assignee: AURORA Konrad G. Schulz GmbH & Co., Mudau, Fed. Rep. of Germany

[21] Appl. No.: 621,433

[22] Filed: Jun. 18, 1984

Related U.S. Application Data

[63] Continuation-in-part of Ser. No. 415,597, Sep. 7, 1982, abandoned.

[30] Foreign Application Priority Data

Sep. 10, 1981 [DE] Fed. Rep. of Germany ....... 3135909

[51] Int. Cl.⁴ .......................................... G05D 23/00
[52] U.S. Cl. ...................... 236/13; 236/49; 98/38.9
[58] Field of Search ............... 98/38 C, 38 F; 165/20; 236/13, 49

[56] References Cited

U.S. PATENT DOCUMENTS 3,967,780 7/1976 Traver ................................. 236/49
4,294,403 10/1981 Ammons et al. .................... 236/49

FOREIGN PATENT DOCUMENTS 2936058 3/1981 Fed. Rep. of Germany ...... 98/38 C

Primary Examiner—Henry Bennett
Attorney, Agent, or Firm—Becker & Becker, Inc.

[57] ABSTRACT

Apparatus for heating and ventilating vehicle compartments. For temperature control, two parallel ducts are provided. A heat exchanger is located in only one of the ducts. A separate blower is associated with each of the ducts, whereby the speed of both blowers is adjustable simultaneously, and inversely proportional, via an actuating element. A mixture of cold and warm air is possible in this manner within the mixing chamber, whereby a sensitive temperature control can be obtained.

9 Claims, 5 Drawing Figures

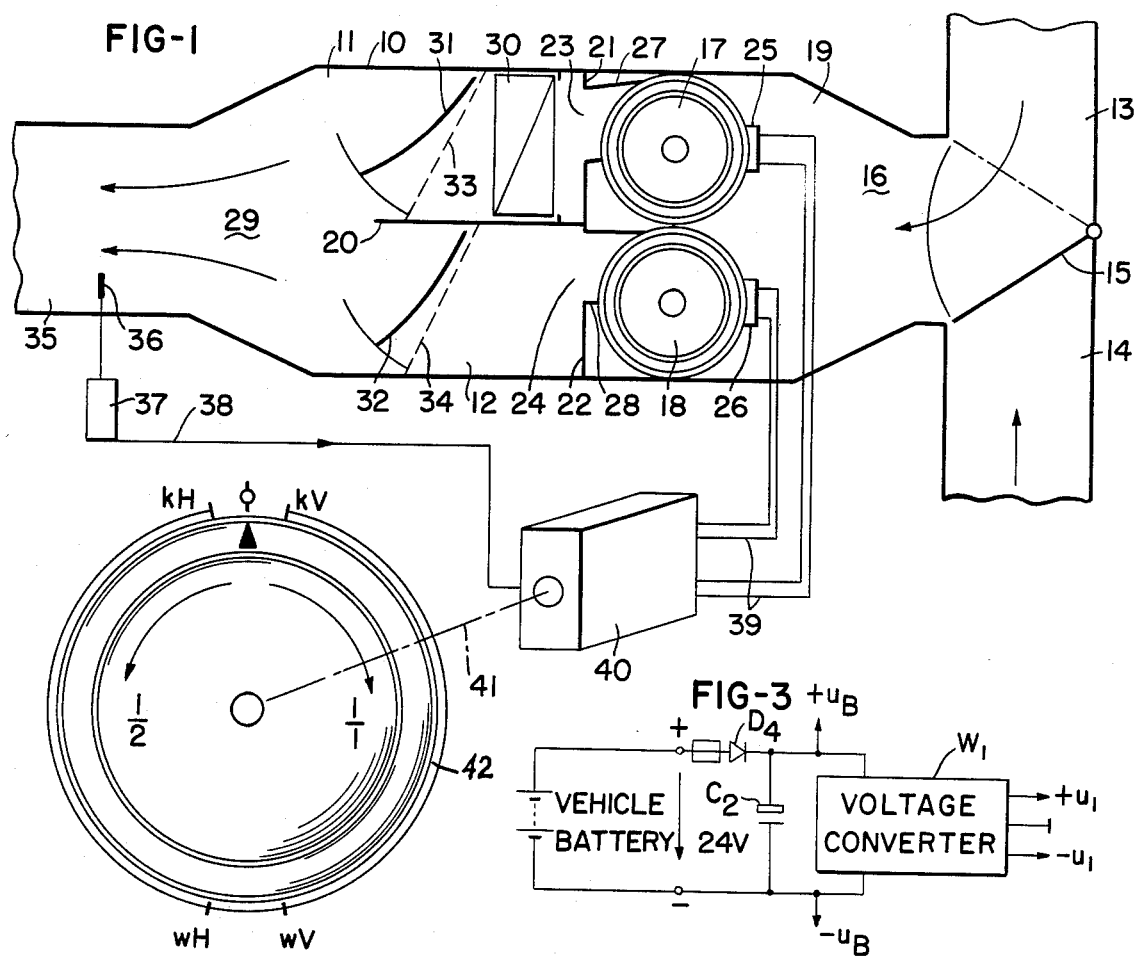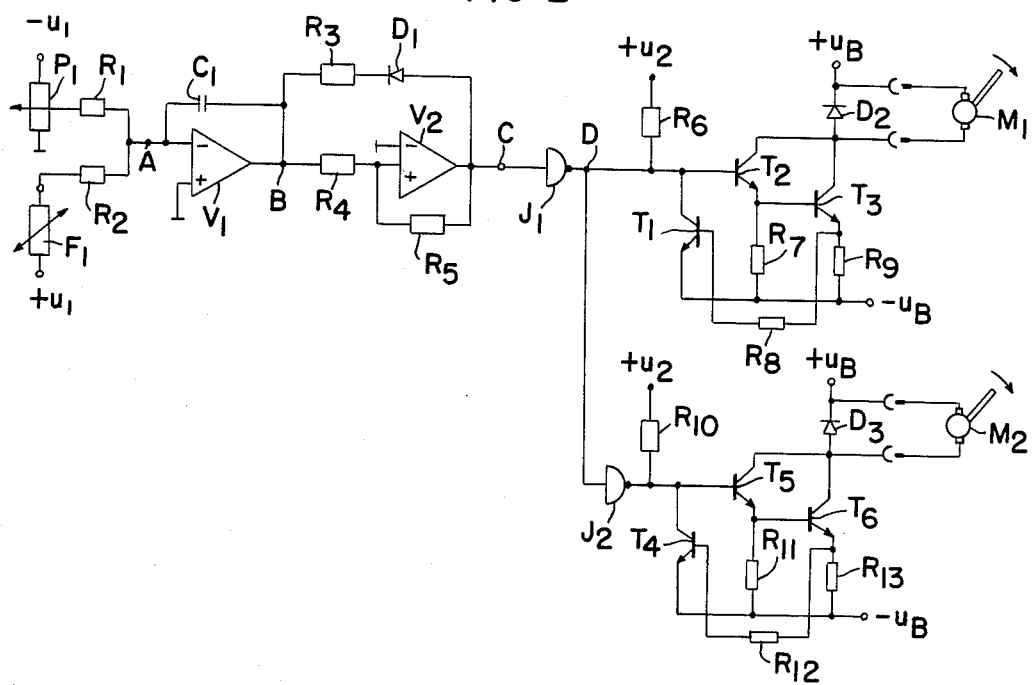

APPARATUS FOR HEATING AND VENTILATING

This is a continuation-in-part of co-pending patent application Ser. No. 415,597—Schulz et al. filed Sept. 7, 1982, now abandoned.

BACKGROUND OF THE INVENTION

1. Field of the Invention

The present invention relates to an apparatus for heating and ventilating vehicle compartments or the like, and comprises: a housing having an air inlet for recirculated air and/or fresh air; a blower; a heat exchanger; and an air outlet or discharge; whereby a secondary air passage or duct is arranged parallel to the heat exchanger, and a mixing chamber for both air flows is provided in the outlet or discharge region.

2. Description of the Prior Art

With one known apparatus of this general type (see German Offenlegungsschrift No. 29 36 058), several blowers are arranged side by side and charge a common space or chamber with recirculating air and/or fresh air; several heat exchangers, likewise arranged side by side, adjoin the space or chamber. Secondary air ducts are provided on both sides of the heat exchangers between these heat exchangers and the walls of the housing of the apparatus. If one blower and one heat exchanger is considered in the flow path, there thus results that a single blower acts not only on the heat exchanger, but also on the secondary air duct with fresh air and/or recirculating air. The two flows are mixed downstream from the heat exchanger, whereby a constant mixing ratio results. The temperature control with the known arrangement is effected by providing a valve in the circulation of the heating medium, e.g. cooling water or cooling oil, of an internal combustion engine; by means of this valve, the heating medium can adjustably act upon the heat exchanger. Such valves, with their adjustment members, are costly and susceptible to disturbance, so that already after a short time of operation there exists the danger that the heat exchanger or heat exchangers no longer operate completely satisfactorily.

Additionally, it is known to provide adjustable flaps or valves in the secondary air duct or ducts of a heat exchanger acted upon by a blower; these flaps or valves, however, primarily make possible a volume control of the supplied air. The flaps or valves also must be provided with adjustment members, resulting in a considerable constructional cost. Additionally, the adjustment members are susceptible to disturbance. Finally, a linear air volume change can be achieved with the flaps or valves only at considerable cost and complexity, since the opening angle of the flaps or valves is not proportional to the air volume flowing therethrough. Furthermore, valves for temperature control are necessary in the circulation of the heating medium. A sensitive, constant temperature control over longer operating times of the vehicle is thereby made more difficult.

SUMMARY OF THE INVENTION

In contrast, it is an object of the present invention to provide an apparatus for heating and ventilating vehicle compartments or the like, which apparatus makes possible manually a constant temperature control over longer operating times, and a sensitive temperature control.

This object, and other objects and advantages of the present invention, will appear more clearly from the following specification in connection with the accompanying drawing, which schematically illustrates one exemplary embodiment having features in accordance with the present invention.

The apparatus of the present invention is characterized primarily in that the blower is associated only with the heat exchanger arranged within a duct; in that the secondary air duct has a separate blower, and in that both blowers are also designed for throttling the flow in the respective duct and are controllable in such a manner that their speed is adjustable simultaneously and inversely proportional.

As a result of the inventive configuration, the advantage is obtained that the operator of the vehicle can manually and sensitively control the air temperature for ventilating the driver's seat, for defrosting and keeping the windshield free of fog, and/or for ventilating the passenger space. The driver or operator requires for this purpose only a single actuating element that can at the same time be provided for volume control. Via a temperature sensor, which in an expedient manner is arranged downstream from the mixing chamber, the temperature of the air flow given off by the apparatus can be determined at any time and can be converted into a signal which is supplied to the adjustment member. A closed control circuit results in this manner, and has a reference imput preset via the actuating element. To control the temperature, the speed of the blowers is alternatively, though simultaneously, adjusted from, for example 10% to 110%, and 110% to 10%. The heat/cold equivalent is thereby sensitively adjustable, whereby air flaps and valves in the heating medium can be eliminated.

Pursuant to further advantageous specific embodiments of the present invention, the blowers may be radial-flow blowers, especially cross flow blowers.

A free-swinging check valve flap may be arranged downstream from the blowers in each of the ducts. The heat exchanger, within its duct, may be arranged between the blower and the check valve flap.

Both blowers may be controlled by a single actuating element via an adjustment member.

Initially, the air capacity or the speed of the blowers, and subsequent the speed ratio of the two blowers is adjustable with respect to one another.

During the operation, the speed of the blower, which at any given time is to be reduced, is adapted not to be decreased below a predetermined minimum value, which is approximately 10% of the full load speed.

The freely swinging check valve flaps may be rubber flaps or tongues, the seat of which is inclined with respect to the flow. Alternatively, the freely swinging check valves may be constructed as pendulum flaps which are mounted above a seat arranged at an incline with respect to the flow.

The inlet region of the housing of the apparatus may have a control flap between a fresh air inlet and a recirculating air inlet; by means of this flap, the mixture ratio of fresh air to recirculating air can be adjusted.

BRIEF DESCRIPTION OF THE DRAWINGS

FIG. 1 is a schematic illustration of an apparatus for vehicle heating and ventilating as an exemplary embodiment having features in accordance with the present invention.

FIG. 2 is a circuit diagram of a double potentiometer as can be provided within an adjustment member of FIG. 1.

FIG. 3 is a simplified circuit diagram that shows a vehicle battery and voltage convertor arrangement for the apparatus of the present invention.

DETAILED DESCRIPTION

Figure 4:
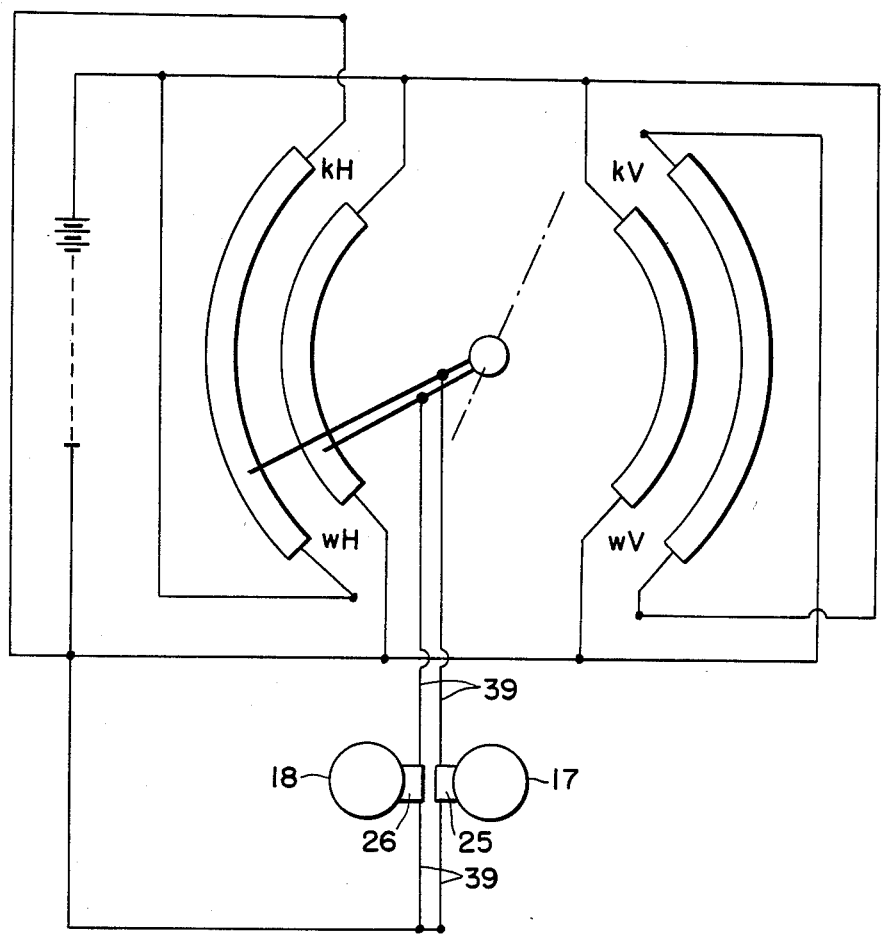
FIG. 4 is an enlarged view of a further schematic illustration of a portion of the apparatus of FIG. 1.

Referring now to the drawings in detail, the apparatus has a housing 10 with two ducts or passages 11 and 12 arranged parallel to each other. The housing 10 can be arranged below the windshield in order to heat and ventilate the driver's seat and the windshield. The housing 10, however, also can be arranged in the roof of a bus in order to act upon non-illustrated roof ducts or conduits which are provided with ventilation nozzles for the passenger seats. A separate device or apparatus can be provided for each roof duct or conduit.

A fresh air inlet 13 and a recirculated or return air inlet 14 are provided at the inlet side of the housing 10. The mixture ratio of fresh air to recirculated air can be controlled by a flap or damper 15 which is located in the inlet region 16 of the housing 10.

Two blowers 17 and 18 are additionally provided in the inlet region 16 of the housing 10. The blowers 17 and 18 are cross-flow blowers having axial air inlet openings which are arranged at a sufficient distance from the side walls 19 of the housing 10.

The passages or ducts 11 and 12 are separated by a partition 20 within the housing 10. The duct 11 has a wall 21 in the direction of the blower 17. The further or secondary air duct 12 also can have a wall 22 before which the blower 18 is located. Openings 23 and 24 are provided in the walls 21 and 22 for the radial pressure connections 27 and 28 of the blowers 17 and 18. Each of the blowers 17 and 18 can be constructed as a double-suction cross-flow blower, whereby a non-illustrated motor having a junction connecting box 25, 26 is located between the two fanwheel blowers.

Each of the ducts 11 and 12 is provided with a check valve 31, 32, which can be a simple rubber tongue or flap which rests on a slanted seating surface 33, 34 when the check valves are closed. The seating surfaces 33 and 34 can have numerous smaller openings in the manner of a sieve or screen, or a single, larger opening can be provided. Swinging or pendulum flaps or valves also can be provided in place of the rubber flaps 31, 32 which are fastened on one side.

A heat exchanger 30 is arranged within the duct 11 between the blower 17, or the wall 21, and the check valve 31; the heat exchanger 30 completely fills the space between the side walls 19, the partition 20, and the outer shell of the housing 10.

An outlet or discharge region, which forms a mixing chamber 29, is connected downstream, or at the outlet end, of the two ducts 11, 12. The mixing chamber 29 can be connected via a duct or conduit 35 to a non-illustrated distributor having air discharge nozzles or jets. The conduit 35, however, also can lead directly into roof ducts.

A temperature sensor 36 is expediently provided within the conduit 35; this sensor is connected to an adjustment member 40 via a converter 37 and signal line 38. Control lines 39 lead from the adjustment member 40 to the junction boxes or connectors 25 and 26 of the blowers 17 and 18. The adjustment member 40 is connected with an actuating element 42 via a shaft 41. The actuating element 42 is expediently a handwheel which can be operated by the driver or operator for temperature control.

In the illustrated embodiment, the actuating element 42 allows an infinitely variable control of the air temperature between a low value k and a high value w. Furthermore, a volume control is possible by half load kH to wH, and by full load kV to wV. The scale or dial of the actuating element 42, however, also can be divided into four quadrants, expediently including, as seen in the clockwise direction, sequentially: full load k to w, three quarters load w to k, one quarter load k to w, and half load w to k. The adjustment elements inside the adjustment member 40 are then correspondingly arranged and constructed. At the setting kH, only the blower 18 runs at half speed, and at the setting wH, only the blower 17 runs at half speed. The two blowers 17 and 18 run at one fourth of their full speed at a setting exactly in the middle between kH and wH. Correspondingly, the two blowers 17 and 18 run at half speed in the middle position between kV and wV.

The air temperature is continuously readjusted to the preset value by means of the feedback coupling via the temperature sensor 36 and the transposer or converter 37.

The blowers 17 and 18 also have a throttle effect or damping action, so that when one of the blowers 17 and 18 is stopped or runs at a minimum speed, the corresponding duct is completely closed due to cooperation with the check valve 31 or 32, and the entire air flow flows through the other of the two ducts.

The adjustment elements inside the adjustment member 40 operate electronically, and can be designed in such a way that the operating voltage for the blowers 17 and 18 is supplied via the control lines 39.

Since the heating medium, such as cooling water, is no longer supplied via valves to the heat exchanger 30, there results a more uniform flow, as a result of which the heat exchanger is protected. Furthermore, the entire heat capacity is immediately available, since the heat exchanger 30 is always acted upon by the heating medium. Immediately after the blower 17 is started, the check valve 31 opens and a rapid mixing with the colder air from the secondary air duct 12 occurs in the mixing chamber 29. Turbulance-imparting inserts as well as nozzle-like restrictions can be provided in the mixing chamber 29 in order to attain an especially uniform mixing, and hence a uniform temperature distribution.

The control box or adjustment member 40 that regulates the inverse operation of the two fans can be described in further detail such that one skilled in the art could make or use features of the present invention. A control circuit can be provided to show how the control box or adjustment member 40 interacts with the temperature sensor 36 and the manual adjustment 42 to control the fan speed. A common thermostat to control and regulate a sensed temperature is old and well known in the art. In the event that one skilled in the art would need to know more than just the fact that an on-off thermostat is a conventional device in order to practice the present invention, the speed of the blowers is to be regulated in inverse relationship to each other with the additional parameter that the total air flow from both blowers remains constant. This control scheme to regulate the blowers in addition to the blower control being responsive to a sensed temperature possibly is more than a single on-off temperature control thermostat. A circuit to provide a disclosure of details of this aspect is set forth in the following paragraphs.

The basis concept or fundamental idea of the present invention is seen in the arrangement of the blowers 17 and 18, whereby the control via adjustment member 40, shaft 41, actuating element 42 and the subsequent or post-control or regulation including the temperature sensor 36, convertor 37 and signal lines 38 are not to be considered as elements essential for the present invention, since these components are known from the control of every conventional central heating system which operates with a thermostat. There is believed that it should be considered sufficient to explain that these elements including the temperature sensors 36, converter 37, signal line 38 or adjustment member 40, shaft 41, and actuating member 42 are not to be considered as the teaching or features of the present invention.

FIG. 2 shows a circuit diagram of a double potentiometer as can be provided, for example, within the adjustment member 40 of FIG. 1. With reference to this circuit diagram, there can be noted with respect to the description of the adjustment member 40 for control of the two blower motors that the circuit of the adjustment member consists of a control circuit including a final control element or regulating unit $P_1$, of which the positioning determines the rated value (ideal value) of the temperature, a feeler or sensing element $F_1$, which inverts the temperature into a corresponding resistance value, a circuit with amplifiers $V_1$ and $V_2$, which convert the control deviation or departure of the point A into a pulse-duration-modulated voltage at point C, two amplifying invertors $J_1$ and $J_2$, as well as two identically constructed power output stages consisting of $T_1$, $T_2$, $T_3$ or $T_4$, $T_5$, $T_6$, which serve for controlling of the motors $M_1$ and $M_2$.

The power or current supply of the motors and of the adjustment member is connected pole-safe via the diode $D_4$ of FIG. 3; the supply of the amplifiers $V_1$ and $V_2$ occurs via a voltage converter $W_1$ with the voltages $+U_1$ and $-U_1$.

The condenser $C_1$ of FIG. 2 is provided together with the employed motors $M_1$ and $M_2$ as well as with the resistances $R_1$, $R_2$, $R_3$ and $R_4$ so dimensioned or measured that the sum of the speeds of the motors $M_1$ and $M_2$ is approximately constant. With that there is assured and made possible a constant air through-passage per time unit independently of the desired temperature.

Figure 5:
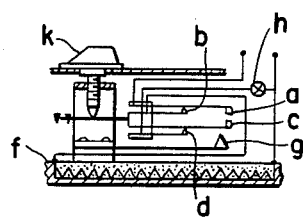
FIG. 5 is an illustration of a thermostat having features related to the present disclosure.

FIG. 2 represents the circuit diagram of a double potentiometer as can be provided, for example, within the adjustment member 40. Reference also can be made to FIG. 5 similar to a view of page 552 from the "Brockhaus" Encyclopedia of 1973 with attention being directed particularly to the statement concerning a temperature regulator or thermostat. The definition in the encyclopedia for this temperture control is stated as a discontinuous two-point regulator (→regulation), which maintains a predetermined temperature rated value or desired value by effectiveness upon a heating- or cooling-power or capacity. With a simple electrical temperature regulator or control current, connection exists going via the contacts a and b by way of the heating winding imbedded in the sole or base plate f. Upon heating-up, the bimetal strip g bends upwardly, closes the power circuit via the contacts a, c and d of the control lamp h and opens the contacts a-c upon further heating-up. The temperature can be controlled or regulated with the temperature selector k. Electrical and electropneumatic thermostats for larger requirements operate with resistance thermometers or thermoelements as temperature feelers, pneumatic temperature regulators with steam voltage thermometers. With electrical heating, there is noted that the temperature regulator is effective or operative electrically upon a switch; with gas- or steam heating, the same occurs electrically or pneumatically upon control valves; with hot water heating with solid fuels, this occurs mechanically upon the air flap; with hot water heating with oil (oil heating), this occurs by being effective upon oil supply. The structural unification of the temperature regulator or control with the heating device is also called a *thermostat*.

The diagrammatic illustration in FIG. 5 similr to that of page 552 of the encyclopedia "Brockhaus" includes the designation as follows: temperature control or regulator of a pressing iron or ironer: a-d contacts, e heating winding; f sole or base plate; g bimetal strips; h control lamp; k temperature selector.

Thus the temperature selector k is formed by the actuating element 42 with the teaching or features of the present invention, whereby via the circuit reproduced therewith there is actuated an adjustment member which within the housing 40 that is designated in the application generally as an "adjustment member" sets or adjusts the shaft with the potentiometer arms.

A multiplicity of such circuits are conceivable though the present invention does not seek protection for this aspect thereof.

Also, there does exist a purely electronic control which can be arranged approximately according to the foregoing statements. Even though a conventional circuitry for a temperature control or regulator is involved herewith, there is noted that the crux of the invention does not relate to such circuitry but rather to the improvements of the present invention as set forth in the present description as originally presented.

The present invention is, of course, in no way restricted to the specific disclosure of the specification and drawings, but also encompasses any modifications within the scope of the appended claims.

What we claim is:

1. An apparatus for heating and ventilating, said apparatus comprising:
   a housing having an air inlet region for recirculated air and for fresh air; an air outlet region; a mixing chamber located upstream of, and in communication with, said outlet region; and a first and second duct arranged parallel to one another and in communication with said inlet region and said mixing chamber;
   a separate blower respectively arranged in each of said first and second ducts;
   a heat exchanger arranged in said first duct between said blower thereof and said mixing chamber;
   means for adjustably controlling the speed of both of said blowers, and hence the flow in said first and second ducts, in a simultaneous and inversely proportional manner; and
   said blowers are radial-flow blowers, including in each of said first and second ducts, downstream from the associated blower, a free-swinging check valve flap.

2. An apparatus according to claim 1, in which said blowers are radial-flow blowers.

3. An apparatus according to claim 1, in which said heat exchanger is arranged in said first duct between said blower and said check valve flap thereof.

4. An apparatus according to claim 3, in which said means for adjustably controlling both of said blowers includes an adjustment member which is provided with a single actuating element.

5. An apparatus according to claim 4, in which said means for adjustably controlling both of said blowers is designed to initially adjust the air capacity, i.e. the speed, of said blowers, and to subsequently adjust the speed ratio of said blowers relative to one another.

6. An apparatus according to claim 5, in which said means for adjustably controlling both of said blowers is designed to not decrease the speed of a given blower during operation below a predetermined mimimum value which is approximately equal to 10% of the full load speed.

7. An apparatus according to claim 6, in which said free-swinging check valve flaps are rubber flaps; and in which said housing includes respective seats for said flaps, said seats being inclined to the direction of flow of air through said first and second ducts.

8. An apparatus according to claim 6, in which said free-swinging check valve flaps are pendulum flaps; and in which said housing includes respective seats for said flaps, said seats being inclined to the direction of flow of air through said first and second ducts, said flaps being relatively mounted above an associated seat.

9. An apparatus according to claim 6, in which said air inlet region of said housing includes a separate fresh air inlet and recirculated air inlet, and a control flap disposed between said separate air inlets for adjusting the mixture ratio of fresh air to recirculated air.

* * * * *